Patented Nov. 13, 1951

2,574,652

UNITED STATES PATENT OFFICE 2,574,652

PROCESS OF PRODUCING NEEDLE CRYSTALS OF MAGNESIUM CARBONATE

Lewis B. Miller, Ambler, Pa., assignor to Keasbey & Mattison Company, Ambler, Pa., a corporation of Pennsylvania No Drawing. Original application March 15, 1939, Serial No. 261,963. Divided and this application July 8, 1946, Serial No. 682,159

3 Claims. (Cl. 23—67)

The invention relates to the production of magnesium compounds for insulation and for technical and pharmaceutical uses.

In prior practice magnesium carbonate for insulation has been produced by raising an aqueous solution of the bicarbonate substantially to the boiling point to precipitate out the magnesium as the basic carbonate. In using this basic carbonate in the manufacture of molded heat insulating products, it is mixed with asbestos fiber and related materials and molded to sizes considerably larger than the desired finished pieces because of the variable shrinkage on drying and the consequent necessity of allowing for maximum shrinkage in all of the pieces. This of course results in wasteful trimming off of large percentages of the molded pieces in preparing the finished article.

Such basic carbonates also usually contain iron compounds in amounts exceeding the permissible limits according to the specifications of the U. S. Pharmacopoeia so that the carbonates are unsuitable for some technical and pharmaceutical purposes.

The object of this invention is to provide carbonate of magnesium in a special crystalline precipitate advantageous over the prior carbonates in avoiding shrinkage in the molded product while giving an accurate control of the final insulation as to density, hardness, strength and other qualities.

A further object of the invention is to produce a relatively pure magnesium basic carbonate substantially free of iron compounds and conforming to the specifications of the U. S. Pharmacopoeia.

In carrying out the process of this invention the magnesium is put into the form of a water solution of magnesium bicarbonate of a concentration corresponding substantially to that used in common practice for the production of the basic carbonate from the bicarbonate. For instance, calcined dolomite is first hydrated with water and then carbonated with carbon dioxide gas until substantially all of the available magnesia is thrown into solution as magnesium bicarbonate, the calcium carbonate being precipitated and separated out by mechanical means leaving the magnesium bicarbonate in solution.

This bicarbonate solution in the boiling equipment or magnesia kettles, as they are called, is then heated to an intermediate degree of temperature well below boiling. Preferably the temperature is approximately 150° F. to 160° F. but temperatures as low as 130° F. and as high as 175° F. have proven usable. By avoiding boiling this controlled intermediate heat treatment precipitates a portion of the magnesium in the form of needle crystals, the character and size of which may be accurately controlled by regulating the strength of the magnesium bicarbonate liquor used and the temperature and rate of the heating. The lower the temperature and the less the strength of the magnesium bicarbonate liquor, the larger and longer are the resulting crystals which in preferred form have a composition indicated by the formula $$MgCO_3 \cdot 3H_2O$$ 

Insulating products of high quality are obtained when the needle crystals are held below the approximate average size: 100 microns in lengths by 10 microns in thickness. Insulations can be produced from needle crystals of large size but the resultant insulation will not be of the highest quality. Comparatively thin needle crystals tend to form insulations of the higher qualities. Thus, when needle crystals are formed in which the thickness is approximately 10% or less of the length the quality of the insulations is better than where crystals comparatively thick in proportion to their length are used.

The size and relative dimensions of the needle crystals are controlled by several factors, where the needle crystals are produced by the application of heat alone in a boiling kettle. Three of these are: length of time of heating, temperature of heating, concentration of the original magnesium bicarbonate solution. The temperature of heating has already been discussed. A length of time of heating in which the average time of the magnesia bicarbonate solution in the boiling kettle does not exceed 5 to 6 minutes is desirable. It has also been found desirable to use solutions not lower than 1.4% in magnesium bicarbonate content and preferably above 1.6% in strength. These factors tend to offset each other to some extent. Thus, with solutions of relative high strength (e. g. above 1.75% in magnesium bicarbonate content) a somewhat longer time cycle may be used.

The insulations obtained by intermixing the desired needle crystals of magnesium carbonate, asbestos fibers and/or other suitable ingredients, casting the mixture into desired forms and causing the mixing to set by the application of either heat or suitable chemical reagents, are of optimum strength, lightness and other desirable characteristics if the needle crystals are not too large.

These needle crystals of this form of magnesium carbonate have proven especially advantageous in heat insulating compositions in reducing shrinkage of the composition during drying and in maintaining low density and high quality in the product. The formed articles may be dried directly or first removed from the molds, placed on racks and then dried.

The heating or "partial boiling" of the magnesium bicarbonate solution in these needle crystals may be carried out by either the so-called "batch boiling process" or by continuous boiling, preferably the latter because of the greater ease with which the operation may be controlled to produce the desired crystal characteristics in the carbonate of magnesium formed.

The setting or hardening reaction which occurs when the mixture of the needle crystals and asbestos fiber is subjected to heat following molding may be effected advantageously by other methods than by the application of heat. Solid materials of a basic nature such as magnesium oxide or hydroxide, calcium hydroxide, hydrated calcined dolomite or any other appropriate chemical material with sufficient affinity for carbon dioxide being incorporated in the mix with the magnesium carbonate needle crystals and asbestos fiber may be used to cause setting and hardening of the mixture. Similarly treatment of the needle crystal-asbestos formed articles by ammonia gas or by solutions of alkaline salt such as ammonium hydroxide, caustic soda, tri sodium phosphate, or sodium meta silicate may be used to cause setting and hardening of the mix. Some of the soluble salts are particularly desirable because of the "case hardening" effect which they have upon the formed articles, particularly when the articles are cast to exact size so that the outer layers of the formed article are not removed by a milling operation. This "case hardening" effect adds materially to the strength and hardness of the finished article. Where chemical reagents are used lower temperatures can be used than where heat alone is used for precipitation of the needle crystals. With sufficiently strong chemical reagents, room temperatures may be used.

The heating or "partial boiling," for instance under reduced pressure, precipitates out only a part of the magnesium bicarbonate in the solution and the remaining solution after removal of the needle crystals is passed on to a second boiling kettle where the temperature is raised substantially to the boiling point whereby the magnesium is precipitated as magnesium basic carbonate which may then be used in the usual manner in the manufacture of magnesium insulations or preferably may be dried, processed and sold as technical or pharmaceutical magnesium compounds. This magnesium basic carbonate precipitated after removal of the needle crystals is especially pure because the first precipitate of needle crystals has the effect of removing impurities objectionable in the magnesium basic carbonate. This is particularly true of iron compounds which are substantially completely removed by the first formed crystals.

The permissible content of iron in magnesium basic carbonate and in other magnesium compounds manufactured from a magnesium basic carbonate is very low. By first heating the bicarbonate solution to an intermediate temperature a part of the magnesium salts together with most of the iron compounds are precipitated out and by separating the solids thus formed from the remainder of the solution by mechanical means this remainder may be used in this purified form for the manufacture of pharmaceutical and technical magnesium products by processing in the usual way.

Impurities other than iron compounds such as lime silica and the like are likewise substantially reduced by formation and removal of the first precipitate.

The process of this invention thus uses the first precipitate to obtain an advantageous form of needle crystals of magnesium carbonate and depends on this first precipitation to remove much the larger portion of iron compounds present in the original solution. This leaves the remaining solution purified and conditioned for precipitation of the magnesium as the basic carbonate in very pure form for technical and pharmaceutical purposes and also for insulation or other uses as desired.

Other methods than heating the original solution may be used to precipitate out a part of the magnesium salts together with most of the dissolved or dispersed iron compound. Thus, treatment by basic substances such as caustic soda, magnesium hydroxide, caustic lime and the like in limited amounts at suitable temperatures will likewise cause a partial precipitation of the dissolved magnesium salts and a substantial reduction in the dissolved or dispersed iron compounds remaining with the dissolved magnesium salts.

For instance, to a quantity of magnesium bicarbonate liquor is added sufficient finely pulverized, lightly calcined magnesite to react with approximately one-half of the magnesium bicarbonate in solution. The probable course of the reaction may be indicated by the chemical equation—

$$Mg(HCO_3)_2 + MgO + 5H_2O \rightarrow 2MgCO_3 \cdot 3H_2O$$

The calcined magnesite is stirred into the magnesium bicarbonate solution slowly at room temperature with gentle agitation. The reaction is complete in a few minutes. The reaction may be followed and the time of completion determined by appropriate analytical procedures. The precipitate of needle crystals thus formed contains most of the iron, lime and other impurities. These are separated mechanically, mixed with asbestos fiber and/or other suitable ingredients and used in the formation of insulating materials. The remaining magnesium bicarbonate in solution thus purified is boiled at temperatures approaching 212° F. to precipitate a highly purified type of magnesium basic carbonate suitable for U. S. P. and other purified products.

This application is a division of application Serial No. 261,963, filed March 15, 1939, for "Magnesium Product and Method of Formation," and subsequently abandoned.

I claim:

1. The process of producing needle crystals of magnesium carbonate comprising providing a solution of magnesium bicarbonate of not less than 1.4% concentration, adding thereto magnesium oxide in powdered form at substantially room temperature and reacting and precipitating as needle crystals of magnesium carbonate a portion of the magnesium bicarbonate in solution, and mechanically separating said crystals from the solution.

2. A process as set forth in claim 1 in which the magnesium oxide is added in amount to react with approximately one-half of the magnesium bicarbonate in solution.

3. A process as set forth in claim 1 in which the magnesium oxide is added in amount to react with approximately one-half of the magnesium bicarbonate in solution and the remaining bicarbonate solution after separation of the crystals is boiled at a temperature approaching 212° F. to precipitate a purified magnesium basic carbonate.

LEWIS B. MILLER.

REFERENCES CITED

The following references are of record in the file of this patent:

UNITED STATES PATENTS

| Number | Name | Date |
|---|---|---|
| 1,163,475 | Silbermann | Dec. 7, 1915 |
| 2,139,934 | Chesney | Dec. 13, 1938 |
| 2,209,754 | Abrahams | July 30, 1940 |
| 2,348,898 | Greider et al. | May 16, 1944 |
| 2,358,818 | Miller | Sept. 26, 1944 |
| 2,396,915 | Greider et al. | Mar. 19, 1946 |